June 7, 1966   M. P. GOSNELL   3,254,513
CONTROL SYSTEM FOR AUTOMATIC DRY-CLEANING MACHINES
Filed Nov. 1, 1963   6 Sheets-Sheet 1

INVENTOR.
MICHAEL P. GOSNELL
BY
Harry W. Hargis III
AGENT

June 7, 1966   M. P. GOSNELL   3,254,513
CONTROL SYSTEM FOR AUTOMATIC DRY-CLEANING MACHINES
Filed Nov. 1, 1963
6 Sheets-Sheet 4

FIG. 4.

INVENTOR.
MICHAEL P. GOSNELL
BY
Harry W. Hargis III
AGENT

FIG. 5.

INVENTOR.
MICHAEL P. GOSNELL

June 7, 1966  M. P. GOSNELL  3,254,513
CONTROL SYSTEM FOR AUTOMATIC DRY-CLEANING MACHINES
Filed Nov. 1, 1963  6 Sheets-Sheet 6

FIG. 6.

INVENTOR.
MICHAEL P. GOSNELL
BY
Harry W. Hargis III
AGENT

United States Patent Office 3,254,513
Patented June 7, 1966

3,254,513
CONTROL SYSTEM FOR AUTOMATIC DRY-CLEANING MACHINES
Michael P. Gosnell, Philadelphia, Pa., assignor to Philco Corporation, Philadelphia, Pa., a corporation of Delaware
Filed Nov. 1, 1963, Ser. No. 320,683
13 Claims. (Cl. 68—12)

This invention relates to control systems for automatic dry-cleaning machines, and, while of broader applicability, to control systems for machines of the aforementioned type having a pair of cleaning baskets.

The invention has as a general objective interrelating the control systems for cleaning basket means of a dry-cleaning machine with the control system for the solvent reconditioning means, in order that the basket means may be operated through normal cleaning cycles without interference with or from the solvent reconditioning means.

Among other advantages, the invention achieves economy of original cost and of operation of a coin-operated dry-cleaning machine by affording use of smaller and less expensive solvent filters—due to the fact that they can be cleaned frequently, for example, after every two cycles—and by insuring maximum availability of the machine.

It is a broad objective of the invention to provide a novel control system, in a dry-cleaning machine, for effecting reconditioning of cleaning solvent, which system is characterized by affording a minimum of interference with normal use of the dry-cleaning basket means of the machine.

It is a further and specific objective of the invention to integrate, in a dry-cleaning machine, the control system for reconditioning solvent with the control system for the dry-cleaning basket means to afford maximum availability to users of a coin-operated dry-cleaning machine.

The foregoing as well as other objects and advantages will be more fully appreciated upon considering that dry-cleaning machines, in achievement of solvent reconditioning, heretofore have required periodic down-times to accommodate "backwash" of the solvent filter to drop its associated "cake" into a "demucking" chamber for distillation of the solvent and disposal of the residual "muck." One such apparatus is disclosed in my U.S. Patent No. 3,085,415, issued April 16, 1963, and assigned to the assignee of the present invention. This operation heretofore has been performed periodically, such as at daily or weekly intervals, depending upon the usage of a machine. A machine therefore was out-of-order for a user during the filter and solvent reconditioning operation. Also in a prior-art machine as described, the solvent pump must operate continuously in order to maintain a filter cake on elements of the filter during the intervals between filter reconditioning operations.

The machine in which the present invention preferably is embodied is adaptable to use either a disposable cartridge type filter or a diatomaceous-earth cake type filter, and the novel control system hereinafter to be disclosed contemplates use of either filter. In any event, it is preferred that the filter be backwashed or cleaned after every dry-cleaning cycle. Further in accordance with the invention, the backwashing phase is so divided out of the solvent reconditioning cycle as to permit the user at any time to place clothes, and the required coins, into appropriate sections of the machine.

The invention may be summarized, therefore, as the interrelation of the control elements of separate and distinct systems, i.e. the dry-cleaning system and the solvent reconditioning system, whereby interference between the systems is precluded. Each system advantageously operates in its own predetermined sequence for accomplishing a dry-cleaning cycle and for properly reconditioning the solvent used in such dry-cleaning cycle. Properly conditioned solvent therefore is always available, and it is a feature of the invention that the reconditioning cycle is always so correlated with the dry-cleaning cycle as to afford uninterrupted availability of the machine to a user.

The foregoing as well as other objectives and advantages will be more readily understood upon making reference to the accompanying detailed description, taken in light of the accompanying drawings, in which.

Figure 1:
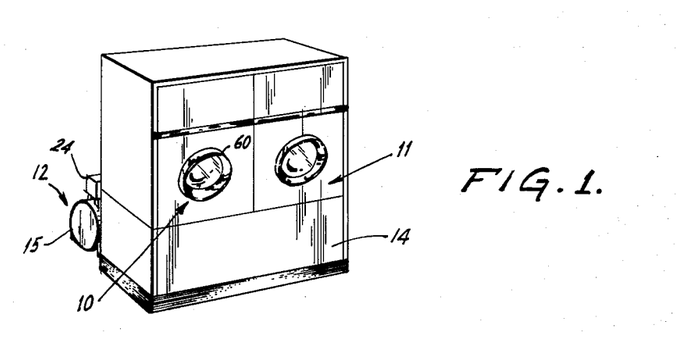
FIGURE 1 is a perspective view of a multi-unit, coin operated dry-cleaning machine embodying the invention.
Figure 3:
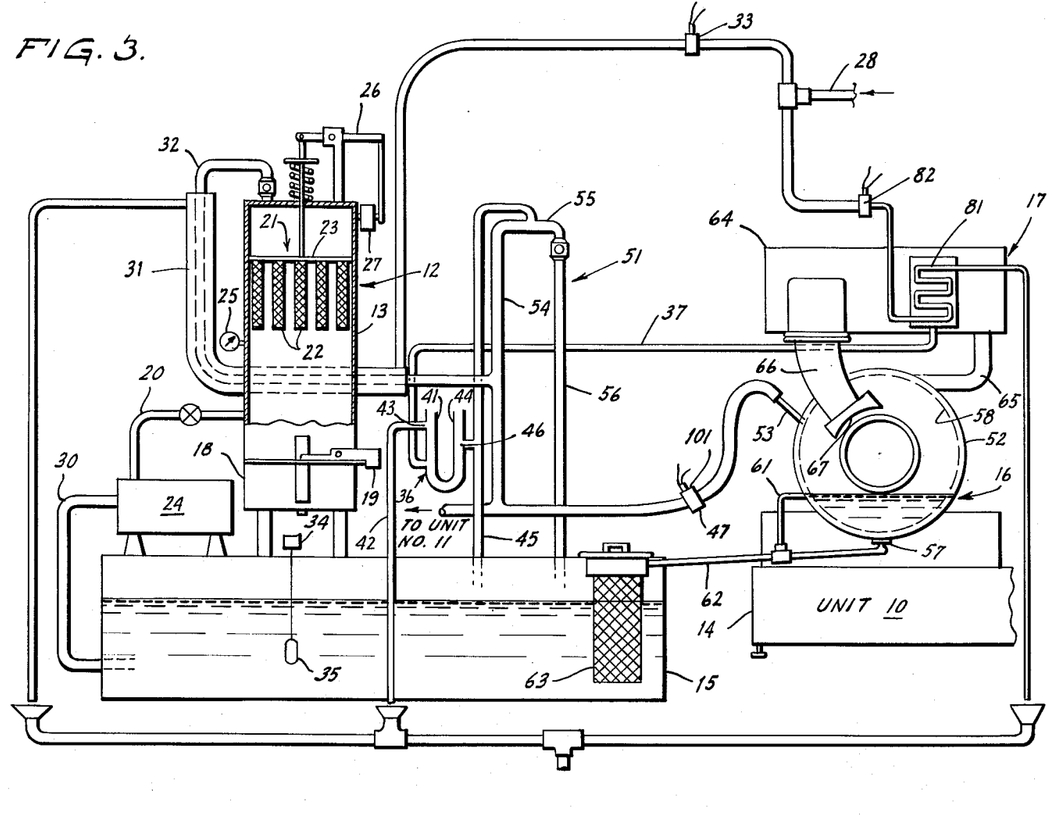
FIGURE 3 is a diagrammatic showing of a dry-cleaning solvent and water circuit system illustrating one arrangement of interconnected conduit elements used in units of the type illustrated in FIGURE 1.

With more detailed reference to the drawings, the dry-cleaning machine shown in FIGURE 1 comprises two complete dry-cleaning units 10 and 11, along with their common solvent supply and reconditioning system 12, a major portion of which is housed within the generally cylindrical enclosure 13 illustrated somewhat diagrammatically in FIGURE 3.

Units 10 and 11 are supported upon a suitably reinforced base pan 14, only unit 10 being illustrated in FIGURE 3 in view of the identity of construction of the units. Unit 10 basically consists of a chassis 16, for example of the type used in commercial clothes washing machines, and supports a solvent condensing and heating system 17. Subsequent and more detailed reference will be made to FIGURE 6 to describe system 17.

*Solvent supply and reconditioning system*

For economy of operation and to achieve maximum compactness in accordance with principles of the invention, both units are serviced by the single solvent storage tank 15 and conditioning system 12. The two dry cleaning units, only one of which is shown in FIGURE 3 as indicated above, preferably are mounted in front of the solvent storage tank 15 and other elements of the solvent supply and reconditioning system 12. However, it will be understood that other suitable positioning arrangements may be resorted to without departing from the scope of the invention.

A solvent filter 21 is located in cylindrical enclosure 13, and, preferably, consists of a plurality of stainless steel braided wire filter tubes 22 each closed off at its lower end and having its upper end disposed in fluid flow communication with a corresponding aperture (not shown) provided in a tube support plate 23 spanning enclosure 13. A pump 24 is disposed and adapted to withdraw solvent from tank 15 through a conduit 30. Pressure is applied to the filter 21 by means of the head developed below the plate—in the lower portion of enclosure 13— during solvent flow induced by solvent pump 24 through conduit 20 and into enclosure 13. This pressure causes each of tubes 222 to contract around a core (not shown) comprising a stainless steel support spring. This contraction of tubes 22 reduces the area of the interstices between the braided wires thereby forming a porous surface ideal for the deposit of diatomaceous earth, clay and carbon precoat which serves as the filtering material. A pressure gage 25 is positioned and adapted to monitor the pressure in the lower portion of enclosure 13, and on the high side of filter tubes 22, to provide an indication of the filter's condition.

To recondition the filter, the solvent pressure is relieved, by deenergizing pump 24, whereupon the filter tubes 22 relax, increasing in diameter and decreasing in length. This change of configuration mechanically assists in loosening contaminated filtering materials from tubes 22. Also, the plate 23 to which the filter tubes are mounted is connected to a crank arm 26 actuatable by a motor 27 that is energized upon deenergization of solvent pump 24. Crank arm 26 is vertically reciprocable by motor 27 to facilitate removal of the loosened contaminated filtering material. The porous filtering material is then re-deposited over the tubes' porous surfaces by again energizing pump 24 to effect flow of the mixture of diatomaceous earth and solvent for a predetermined suitable period hereinafter to be described more fully.

If it is desired to replace the diatomaceous-earth filter media, instead of redistributing the old media over tubes 22, the earth is permitted to fall, when shaken from the tubes, into removable section 18 of enclosure 13. Section 18 is then removed, by manipulating known latch means 19, and is then replaced with a new section 18 filled with new earth.

Figure 3A:
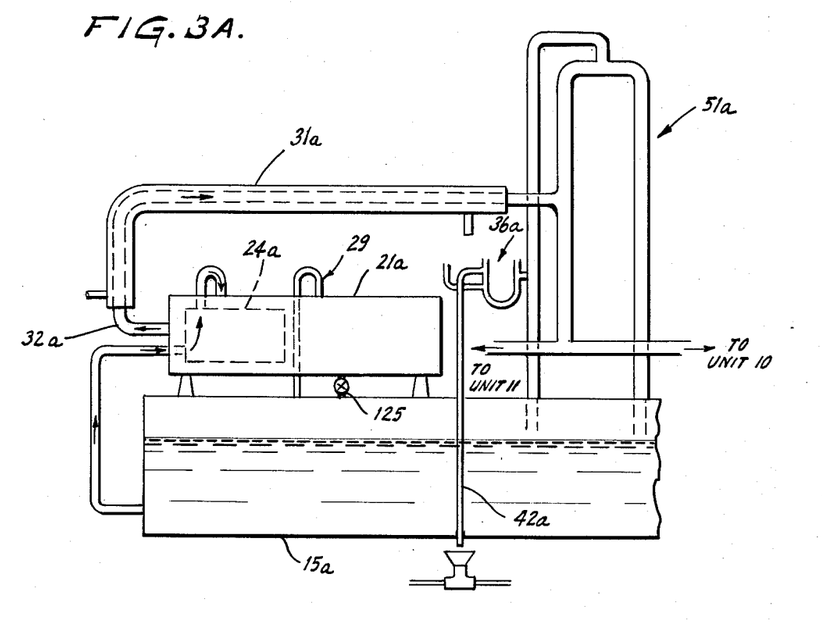
FIGURE 3A is a modification of apparatus illustrated in FIGURE 3.

An alternative filter system is illustrated in FIGURE 3A and comprises a cartridge type filter 21a provided with a solvent drain valve 125 in a conduit leading from the filter to storage tank 15a. An air bleed line 29 facilitates drainage of solvent from filter 21a when changing of the filter cartridge takes place. Other elements are the same as illustrated in FIGURE 3, with the same reference numerals applied followed by suffix a.

Again referring to FIGURE 3, a water jacket 31 surrounds conduit 32 and provides for flow of chilled water in high heat exchange with conduit 32 carrying the solvent, to cool the latter, which conduit supplies solvent from enclosure 13 to the dry-cleaning unit 10. The coolant-water flow is regulated on an on-off basis by a solenoid operated valve 33 connected to a suitable water source 28, which solenoid in turn is controlled by a solvent cooling thermostat 34 having a sensing bulb 35 located within the solvent storage tank 15. When using a solvent such, for example, as perchlorethylene its temperature is desirably maintained between 70° and 80° F. It is important to maintain the temperature of the solvent within the prescribed temperature range in order to prevent the emulsification which occurs at temperatures in excess of 80° F. and to prevent impairment of the solvent's cleaning ability resulting from temperatures below 70° F.

A water separator 36 is located in the condensate outlet 37 from unit 10 to effect removal of any water entrained in the solvent distillate before the solvent is returned to storage tank 15 for recirculation throughout the system by the pump 24. As the mixture enters separator 36 the water rises in the left leg 41 of the U-tube, and because of its lower specific gravity as compared with the specific gravity of the solvent, over-flows into the conduit 42 communicating with the outlet drain 43. Due to the static head developed in the left leg 41 of the U-tube, the relatively denser solvent is forced into the right leg 44 where it overflows into solvent outlet 46 located below the level of the water overflow outlet drain, and returns to storage tank 15 through a conduit 45 communicating with the solvent outlet.

To provide for flow of solvent through the filter when unit 10 is not in use, a diverter valve 47 is disposed in combination with an inverted U-tube circuit 51 as shown. The left hand leg 54 of U-tube circuit 51 communicates with conduit 32 at a point above the level of a solvent fill pipe 53, leg 54 extending upwardly to loop portion 55 connected to right hand leg 56 which leads downwardly into storage tank 15. Loop portion 55 communicates with conduit 45 above solvent outlet 46 and serves as an anti-siphoning device for U-tube circuit 51. Construction and arrangement of the U-tube circuit is such that when valve 47 is open, solvent is pumped from the top of enclosure 13, through the conduit 32 where it is cooled by water jacket 31, and thence through lower portions of leg 54 and directly into the tub 52 of unit 10 by way of fill pipe 53. When valve 47 is closed, solvent flows upwardly through the leg 54, loop 55, and downwardly through leg 56 of the inverted U-tube circuit into storage tank 15. Conduit 45 interconnects loop 55 of the U-tube circuit with tank 15 to prevent siphoning of solvent from the latter when valve 47 is opened for supply of solvent to tub 52.

The solvent level within tub 52 is maintained as shown by a solvent flow restriction in the tub outlet port 57 and by provision of a side drain 61 connected to conduit 62 leading from the tub drain 57 to tank 15 via a button trap 63.

It will be appreciated that leg 54 communicates with like solvent valve and inlet pipes of unit 11, but to avoid unnecessary duplication of description none will be illustrated for the second unit.

*Solvent heating and condensing system*

Figure 6:
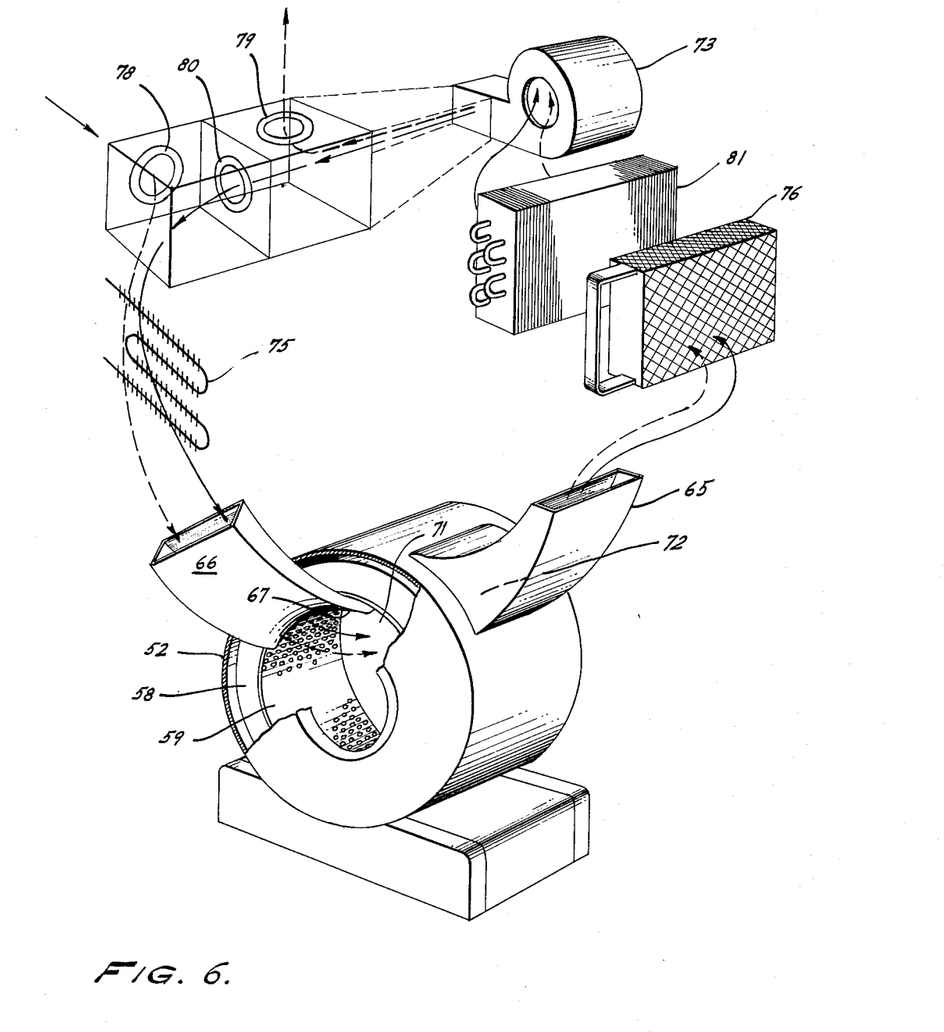
FIGURE 6 is a diagrammatic representation of the drying system used with each of the dry-cleaning units.

Each of units 10 and 11 is provided with a solvent condensing and heating system 17 of the type disclosed in my referenced U.S. Patent No. 3,085,415, and comprising a box-shaped structure 64 surmounting tub 52, as shown diagrammatically in FIGURES 3 and 6. Ducts 65 and 66 provide communicating passageways between the condensing and heating system and tub 52. An air inlet 67 to tub 52 is provided adjacent the opening for clothes door 60 (FIGURE 1) to permit flow of heated air, in the drying cycle, into the open front end 71 of rotatable clothes basket or container 58. Air flows from basket 58, through perforate walls 59 and exits from an opening 72 located in the curved wall of tub 52 for flow into duct 65, as seen in FIGURE 3.

Heated air is directed (full line arrows, FIGURE 6) by a blower 73 through a system of ducts provided with shutters 78, 79 and 80, thence into basket 58 where it picks up solvent vapors. The solvent laden air is then withdrawn from basket 58, flows through duct 65, and is forced through lint trap 76 for flow therefrom over a water-cooled, finned coil 81. Coil 81 is supplied cooling water from supply conduit 28 under the flow control of solenoid actuated valve 82 operable by suitable means (not shown). Condensed solvent and water from the solvent and water vapor laden air drain from finned coil 81, and flow into water separator 36 by way of conduit 37.

During the "clean" and "spin" phases of the dry-cleaning cycle, the inlet shutter 78, exhaust shutter 79 (FIGURE 6) and duct-blocking shutter 80 are closed completely to seal off the condensing and heating system 17 from the clothes tub and basket, whereas in the "dry" phase shutters 78 and 79 are closed and shutter 80 is opened. These phases, with their sequence of occurrence appear in the left hand column of FIGURE 4, and will be described in detail later. The heater means 75, blower motor 73 and condenser water valve 82 (FIGURE 3) are left deenergized during the "clean" and "spin" phases of the cycle. As will be more fully described later, in connection with FIGURE 2, heater means 75 comprises three separate heater elements 75a, 75b and 75c.

*The dry cleaning cycle*

Figure 2:
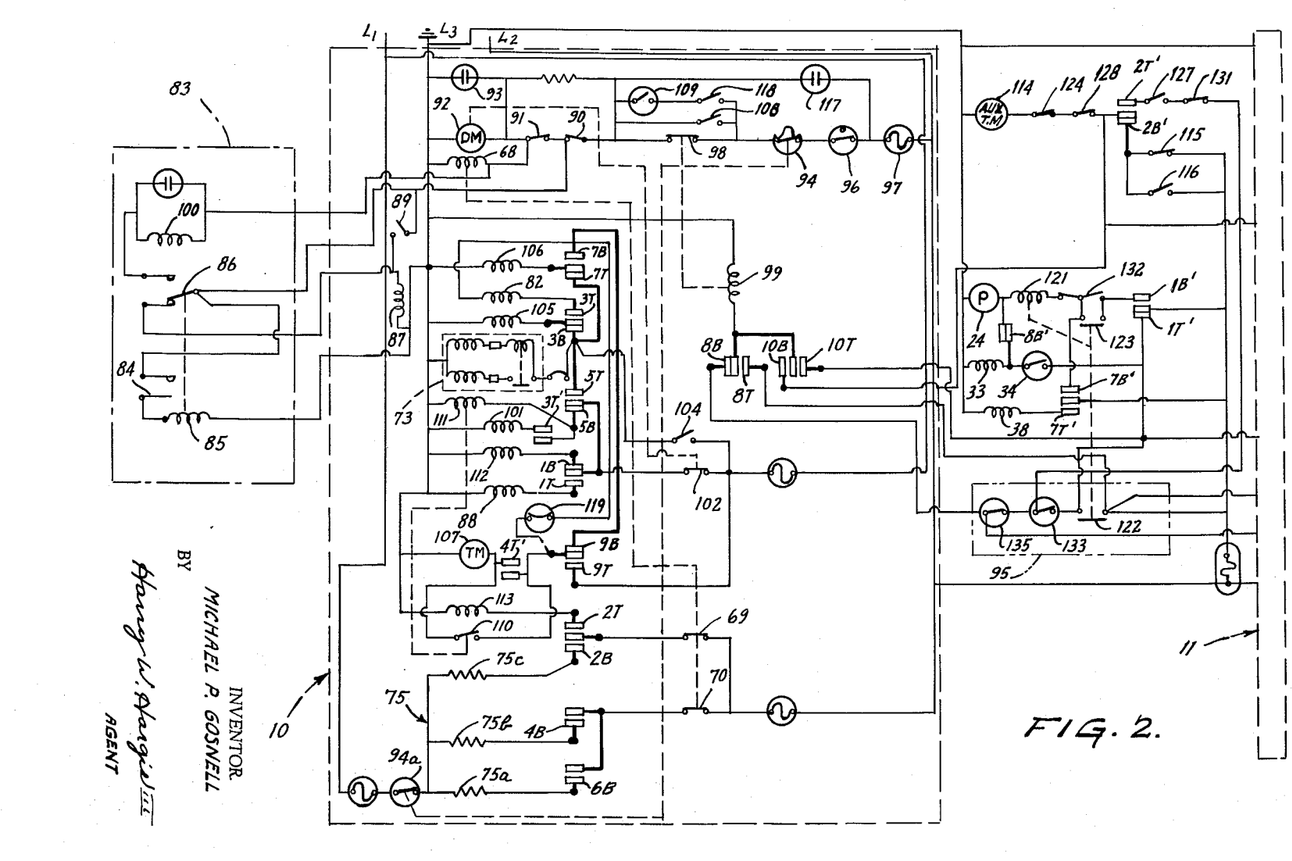
FIGURE 2 is a wiring diagram illustrating one form of electrical circuit for accomplishing automatic control of a plurality of dry-cleaning units and their common solvent reconditioning system, in accordance with the invention.

Referring now to FIGURE 2, either of units 10 and 11 is placed in operation by the insertion of a predetermined number of coins in a coin meter 83 located on the unit front panel. While both dry-cleaning units 10 and 11 may be operated concurrently, for simplicity of explanation the operation of only unit 10 will be described.

To facilitate illustration of the system's control circuit there has been shown only that portion of the circuit which regulates the operation of unit 10, and circuit elements which are common to both units inclusive of each unit's complement of failure sensing devices. The individual control circuit of unit 11 is identical to that part of unit 10 shown enclosed by dashed lines in FIGURE 2 and accordingly has only been symbolically indicated at the extreme right hand side of FIGURE 2.

Considering now a representative operating cycle of unit 10, and first with particular reference to FIGURES 1, 2 and 3, as each coin is dropped into coin meter 83 a coin actuated momentary switch 84 is closed providing a temporary circuit through the coin relay 85. Relay 85 operates a conventional stepper switch (not shown) through a prescribed angular increment for each impulse of current until a cam (not shown) moves the single-pole double-throw switch 86 into the full line position shown on the wiring diagram. This position of switch 86 causes the door lock solenoid 87 to be energized by effectively connecting the same to L2 and L3 of a suitable voltage source, locking the closed door 60 of unit 10. To facilitate servicing of the unit, a manually operable normally open switch 89 may be placed in parallel with switch 86. This permits the unit to be started by an authorized person, independently of the coin actuated switch. The latch (not shown) for door 60 is of the double-acting type and is designed to require a door unlock solenoid 88 to be energized to perform the door unlocking function. Movement of the door latch into the locking position, after closure of door 60 has moved door latch switch 90 to its illustrated closed position, causes a single-pole single-throw door lock switch 91 also to be moved into its illustrated closed position, thereby completing a circuit across L2 and L3 for energizing the unit drive motor 92 and the indicator light 93 located on the front panel, which light signals that the unit is in operation.

Operation of switch 86 also breaks the circuit to coin reject relay coil 100, which relay serves a two-fold purpose. When relay coil 100 is energized it retracts a coin reject tab from the coin path and operates a locking pawl on the spring loaded cam that operates switch 86. Were it not for this pawl, each time the coin relay 85 was energized momentarily there would be only a momentary advance of the cam. As soon as a coin passed switch 84, and relay coil 85 was deenergized, the cam would return to its original position. The locking pawl, operated by relay 100, prevents this return until sufficient coins have been accepted to rotate the cam to a position in which it operates switch 86. However, since relay 100, by the operation of switch 86, is now deenergized, the locking pawl lifts and allows the cam to return to its original rest position. However, before this occurs the door lock solenoid 87 has had sufficient energization time to lock door 60 and close door lock switch 91. Now, even though switch 86 has returned to its original rest position, the coin reject relay coil 100 is shorted by switch 91 and will remain deenergized, in which position it will reject future coins. Also, since the door lock solenoid 87, which was only momentarily energized, is not spring loaded, the latch will remain in the locked position even though solenoid 87 is deenergized.

The wiring diagram of FIGURE 2 shows the control circuit as it would be at the beginning of timer operation after the previously mentioned starting functions have been performed to initiate a dry cleaning cycle.

In addition to the aforementioned switches 90, 91, the drive motor 92 of the dry cleaning unit 10 and the heater solenoid 68 are energized from lines L2 and L3 through serially connected safety switches comprising fuse 97, the heater higher-temperature limit thermostat 94, 94a, the drive motor belt switch 96, and switch 98 operated by out-of-order relay coil 99 energizable by closure of circuit switch means 95 comprising solvent high limit stat 135, high pressure switch 133, and pump motor holding relay 122.

For reasons to be more fully discussed later in the description, energization of heater solenoid 68 effects closure of switches 69 and 70 disposed in the energizing circuits of heater elements 75a, 75b, and 75c.

By way of example it will be assumed that solenoid 101 is energized from L1 and L3 by closure of centrifugal switch 102 and of the timer contacts 5B and 3T' (to be described later), opening the diverter valve 47 (FIGURE 3) associated with coil 101 to direct the circulating solvent into tub 52. The solvent and water flow circuits established during this phase of operation have been described previously in connection with FIGURE 3.

Figure 4:
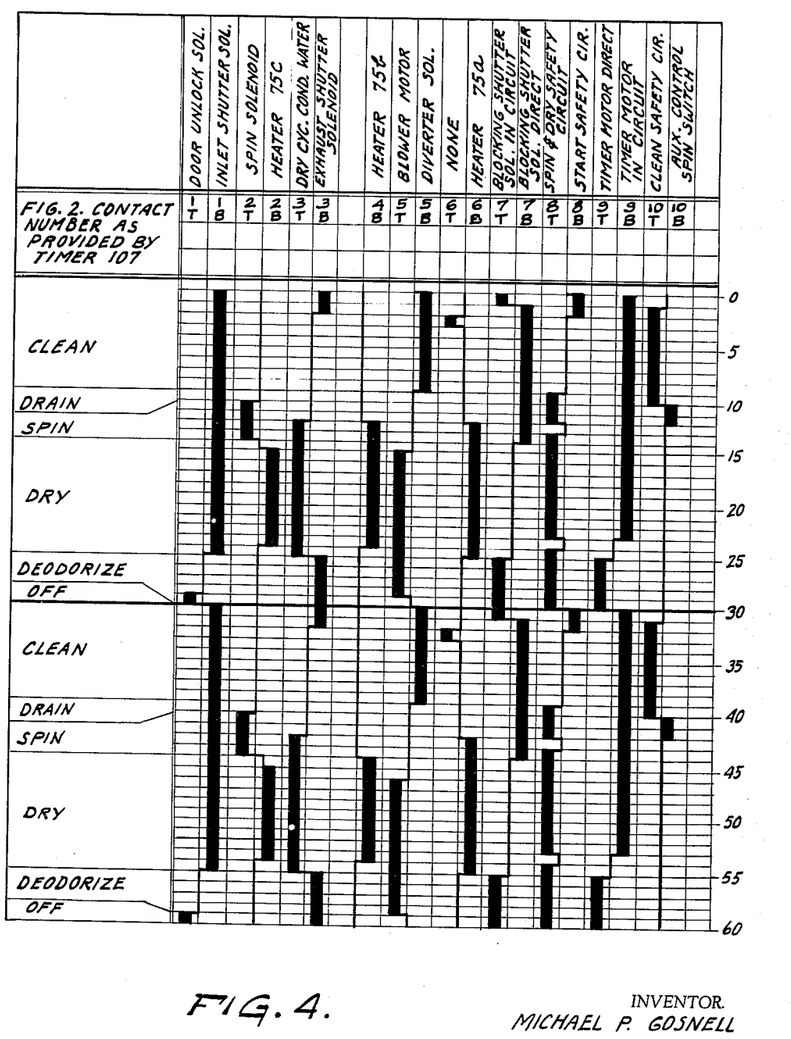
FIGURE 4 is a time chart illustrating the sequence of operations comprising a dry-cleaning cycle.

Operation of the additional elements of the apparatus will be more clearly understood by making more particular reference to the timer cam chart shown in FIGURE 4, where it will be seen that contact 3B is closed, by operation of timer motor 107, during the first two increments or intervals of timer cam operation and the last five intervals of the prior cycle of timer cam operation. By energizing contact 3B the drying system circuit is so conditioned that upon opening access door 60, and thereby causing door switch 104 to close, the blower 73 and the vent solenoid 105 which controls operation of the exhaust shutter 79 and solenoid 106 controlling blocking shutter 80 are energized to vent the unit to the ambient atmosphere. Venting is averted by the normally closed single-pole single-throw door switch 104 connected in series circuit with this contact 3B, switch 104 being caused to open upon closing door 60 whereby vent solenoid 105 and blower 73 remain deenergized. To compensate for wear and to provide a substantial safety factor, the cam which controls operation of contact 3B is constructed to span seven intervals of operation.

The clean phase

The timer motor 107 during the clean phase of operation, and for the first 23 intervals or increments of operation, is maintained energized by either closed contacts 4T' (to be described later) or by switch 110 (to be described later) and closed contacts 9B and the motor centrifugal switch.

Also during this phase of operation, and for the first 25 intervals of timer cam operation, contact 1B is closed to energize solenoid 112 of inlet shutter 78 to close the latter.

I will be noted also that for the first two increments of operation of timer 107 the starting safety circuit 95 is placed in the operating circuit by closure of contact 8B, energizing out-of-order relay coil 99. This contact is then opened for seven increments of timer operation, with contact 10T having closed after one increment to take over energization of coil 99.

When the clean phase has progressed for its nine increments of the timer cams, as driven by timer motor 107, the actuating solenoid 101 of diverter valve 47 is deenergized by opening of its contact 5B (in combination with closed contact 3T') returning the valve 47, through the intermediation of its actuating solenoid 101, to its closed or solvent bypass position. This latter position of valve 47 is maintained during the remainder of the dry cleaning cycle.

The drain phase

The clothes container or basket 58 after completion of the clean phase continues to turn at low speed for the drain phase until the start of the 10th timer increment before going into high speed extraction, in order to provide time for solvent to drain, during the 9th timer increment, from the tub 52 and basket 58 into storage tank 15.

The spin phase

The extraction or spin phase of the cycle is initiated at the start of the 10th increment by closure of contact 2T which provides for energization of the spin solenoid 113. This action, through suitable linkage not shown, produces high speed rotation of the container 58. The extraction phase is maintained for a period of four timer increments to insure removal of a substantial quantity of solvent from clothing in basket 58 in preparation for the "dry" phase. After two timer increments of basket spinning, contacts 3T, 4B and 6B are closed energizing the heaters 75a, 75b of heater means 75, and condenser water solenoid 82 which controls operation of the water cooled condenser drying system atop the tub. This sequence of events occurs several increments of timer operation prior to the actual drying and solvent reclaiming period, in order to preheat the ductwork and improve operating efficiency.

From the 10th to the 14th timer increment contact 10T is opened and 10B closed to remove the dry cleaning safety circuit which has been effectual since the end of the first interval of timer operation.

Switch 10B remains closed for two increments of timer cam operation for the duration of the spin phase. The purpose of switch 10B will be described later in connection with operation of the novel solvent reconditioning circuit, when in the course of such operation it is necessary to drive the auxiliary timer out of its "standby" period.

At the end of the 12th increment of timer cam operation and in the spin phase, it will be seen that contact 1B is still closed, spin solenoid contact 2T is still closed, and contact 3T closes to open solenoid valve 82 and initiated flow of cooling water through condensing coil 81 as previously noted. Also heater contacts 4B and 6B then close, as indicated above. Further, from the 9th to the 12th, from 13th to the 23rd and 24th to 25th increments the contact 8T is closed to take the spin and dry safety circuit 95 out of operation.

During the spin phase it is desirable to make sure that basket 58 has been spinning. A spin sensor switch 108 is connected in parallel electrical circuit with switch contacts 98, which spin sensor switch 108 is closed when spin solenoid 113 is energized. During the 12th increment the out-of-order relay coil 99 is purposely deenergized by opening switch contact 8T. Opening of this switch contact normally would cause drive motor 92 to become deenergized when relay contacts 98 opened, upon which out-of-order light 117 would be energized. However, if spin sensor switch 108 is closed, drive motor 92 and light 117 will not be affected and no deenergization of motor 92 and energization of light 117 will take place.

During the 23rd increment, switch contact 8T will again be opened but this time for a different reason. If there has been a failure of heater means 75, such failure will be indicated by a lower temperature in the drying system. Also, if diverter valve 47 has failed to close after the clean phase, this may or may not cause low temperatures to exist depending upon the degree of valve opening. In either event, there would probably be produced an undesirable staining of the clothes. Switches 109 and 118 of FIGURE 2 represent a temperature sensor stat and a diverter valve actuated switch, respectively. If, during the 23rd interval when switch contact 8T opens to deenergize that out of order relay 99, there has not been sufficient heat input by means 75 to close stat 109 (located in the drying system), or switch 118 (operated by the diverter valve 47) is open indicating the diverter valve is not closed, then motor 92 will not have a bypass circuit around switch 98 and therefore will become deenergized and light 117 will be energized.

*The dry phase*

The spin phase ends and the dry phase begins with the 14th increment of timer cam operation by opening of the spin solenoid contact 2T and the blocking shutter solenoid contact 7B.

At the 15th increment, contact 2B is closed energizing the heater 75c, and contact 5T is closed energizing the unit blower 73 to provide circulation of air through the solvent and water condensing system 17.

The unit is now operating in the "dry" phase, during which the inlet shutter 78 and exhaust shutter 79 remain closed. The air circuit established during the dry phase is schematically shown by the full line arrows in FIGURE 6. The air drawn from the clothes basket 58 by blower 73 is first passed through the removable lint trap 76 to filter out air borne lint. The air is next impinged on condenser 81 where the solvent vapor carried by the heated air is condensed and the air is cooled. The condensed solvent is directed into the storage tank by conduit means 37 (FIGURE 3) after first being passed through the water separator 36 whose operation and construction has been previously described. After removal of the solvent vapors the air is recirculated over heater means 75 to condition the air for further vapor absorption.

At the end of the 23rd increment of operation, contacts 8T and 9B open, and after the 24th increment contacts 2B and 4B open to deenergize heaters 75b and 75c.

Opening of contact 9B normally would stall timer 107 unless solvent saver stat 119 was closed thereby providing an electrical circuit effectively shorting switch contact 9B. Stat 119 will not close until it "sees" a temperature in the lint trap region which indicates that most of the solvent probably has been removed in the "dry" phase. So long as stat 119 is open, timer 107 will not advance any further in the dry phase. When stat 119 does close, or if it had closed when switch contact 9B was opened, timer 107 advances to its 25th increment where switch contact 9T is closed and the circuit of timer 107 bypasses motor centrifugal switch 102. This permits timer 107 to reset itself after the 29th increment even though drive motor 92 has been deenergized by unlocking door 60 at the beginning of the 29th increment.

*The deodorize phase*

The dry phase ends with the 25th timer increment, with the beginning of the "deodorize" phase at which time contact 1B opens to deenergize operating solenoid 112 for inlet shutter 78, contact 3T opens and 3B is closed to energize operating solenoid 105 for exhaust shutter 79, contact 6B opens to deenergize heater 75a, and contact 7T closes to energize operating solenoid 106 for blocking shutter 80.

At the 29th increment of timer operation the door unlock solenoid 88 is energized through closure of switch contact 1T, and the door latch is moved into its unlock position. At the end of the 29th interval switch contact 1T is opened and door unlock solenoid is deenergized. Again, since the latch is not spring loaded it will remain in its unlocked position. Unlocking door 60 opens switch 91 and causes relay 100 to be energized through the relatively low resistance motor windings and coins will be accepted provided, of course, that door latch switch 90 is closed. Switch 90 functions to insure that coins will be accepted only when the door is closed. Since the ability to accept coins depends on the circuit status of relay coil 100, the coin acceptance light is wired across this relay coil to indicate its condition.

The deodorize phase continues until the end of the 29th timer increment, just before which, and at the beginning of the 29th increment contact 5T is opened to deenergize the blower. Upon attaining the 30th increment, the timer contacts and various switches in the circuit revert to their inactive positions, to await another cleaning cycle at the initiation of which the circuits revert to those illustrated in FIGURE 2.

It will be appreciated that the solvent reconditioning phases, while not directly related to the hereinabove described clean phases, cannot be carried out independently of the cleaning unit phases. It will be seen from what follows that it is in fact a cleaning unit phase that initiates and terminates the solvent reconditioning cycle. This dependence is dictated by the following dry cleaning system requirements fulfilled by the novel interrelation of the two control systems herein described:

(1) The cleaning units must at all times, when not in use, accept a clothes load and coins irrespective of the solvent reconditioning phase in progress.

(2) No shortening of the "clean" phase or lengthening of the "dry" phase of a dry cleaning cycle can occur irrespective of the solvent reconditioning phase in progress.

(3) Solvent pump shutdown is not to occur during the "clean" phase of any dry cleaning cycle.

(4) Filter drain (FIGURE 3A) or shakedown (FIGURE 3) is to occur after a minimum of "clean" phases, preferably one.

(5) The solvent pump should be shut down when there are no cleaning units in operation or when there is no demand for solvent cooling.

The manner in which the auxiliary control system coordinates the phases of cleaning unit cycles with the solvent reconditioning phases will be understood from the ensuing description of additional portions of the circuit diagram illustrated in FIGURE 2.

The solvent reconditioning cycle

Figure 5:
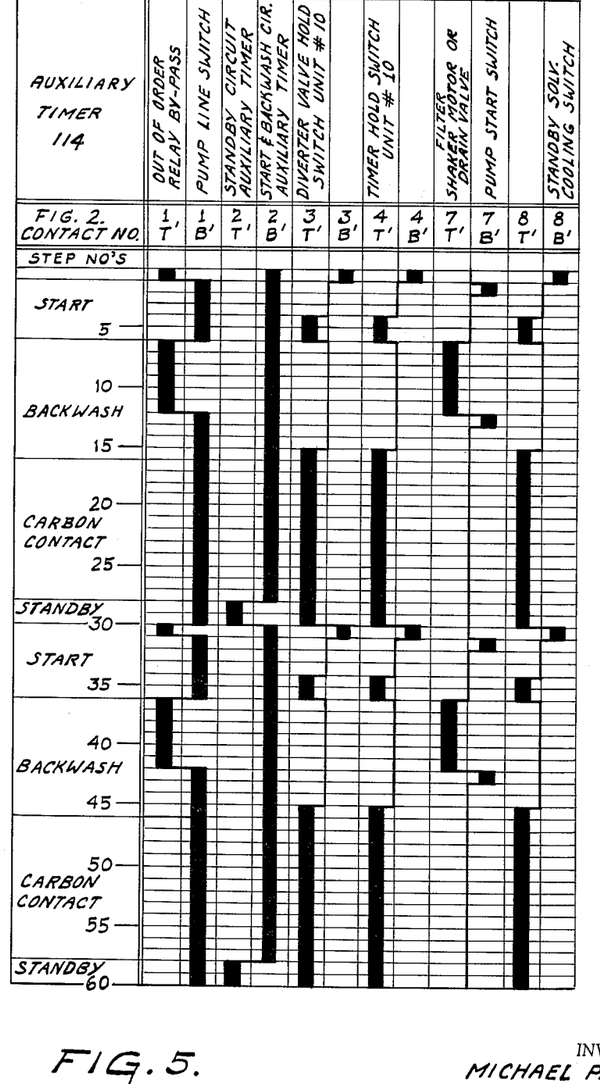
FIGURE 5 is a time chart illustrating the sequence of operations comprising a solvent reconditioning cycle.

Considering now the auxiliary control circuit illustrated also in FIGURE 2 for the solvent reconditioning system, and its relationship to the dry-cleaning system and cycle of operation just described, it will first be assumed that prior to starting a dry-cleaning cycle, the auxiliary timer is at cam position 0 or 30 as illustrated in FIGURE 5. In either of these cam positions switch contacts 2B′ and 1T′ are closed. Referring to the wiring diagram illustrated in FIGURE 2 it will be seen that contact 2B′ is controlled by auxiliary timer 114. However, timer 114 is not energized at this time if it be assumed that, for example, doors of both cleaning units 10 and 11 are unlocked, causing their respective door lock switches 115 and 116 to be open. Also, at this time, the solvent pump 24 is not operating. This would normally cause out of order light 117 to glow on the cleaner front panels. However, the out of order relay 99 has an electrical circuit to L2 through contact 1T′ which is closed, and an out of order condition is not indicated since 8B is closed. This will permit the cleaning units 10 and 11 to accept loads and coins.

Assuming now that a cleaning cycle is started on unit 10, door lock switch 115 is closed and auxiliary timer 114 is permitted to advance. Meanwhile, auxiliary timer switches 3T′ and 4T′ (and 5T′, 6T′ not shown) are open thereby preventing the timer 114 or diverter valve 47 of cleaning unit 10 from being energized. Contacts 5T′ and 6T′ have been mentioned, but have not been illustrated in FIGURE 5 in order to avoid repetition, inasmuch as auxiliary timer contacts 5′ and 6′ are associated with unit 11, and are identical in function, sequence and timing with operation of auxiliary timer contacts 3′ and 4′, respectively. This combination of switch positions, however, does not prevent cleaning unit 10 from tumbling the clothes.

The start phase 27 seconds after cleaning unit 10 is started, or after the passage of one interval or increment of operation of auxiliary timer 114, solvent pump 24 is started by closure of contacts 7B′ and 1B′. This also causes the pump relay coil 121 to be energized so that it keeps its own energizing circuit and the pump's energizing circuit closed by closing switches 123 and 122. Also, the closing of 1B′ opens the circuit to out-of-order relay 99. However, upon energization of pump 24, relay 99 has a circuit through pump relay switch contacts 122. Two intervals later contact 7B′ is opened but has no effect on the pump circuit since contacts of the pump relay switch 123 had been previously closed when relay coil 121 was energized. At the start of the 5th auxiliary timer interval, contacts 3T′ and 4T′ are closed and cleaning unit 10 advances into the "clean" period or phase and receives solvent. However, the opening of diverter valve 47 has caused the unit 10 diverter valve actuated switch 124 in series with auxiliary timer 114 to open, thereby stalling the timer. Switch 128 is actuated by the diverter valve of unit 11 and functions in the same manner as switch 124. Cleaning unit 10 meanwhile progresses through its "clean" period without interruption. At the end of the "clean" period the above mentioned diverter valve actuated switch 124 again closes and auxiliary timer 114 progresses into the 5th interval. If cleaning unit 11 should be started prior to the end of the 6th interval it would receive solvent and progress immediately into the "clean" period since the solvent pump is running and contacts 3T′, 4T′, 5T′ and 6T′ are closed. This action would once again stall the auxiliary timer. If cleaning unit 11 had not been started, auxiliary timer 114 would have progressed into the 7th interval closing contacts 1T′ and 7T′ and opening 1B′, 3T′, 4T′, 5T′ and 6T′. This latter condition would deenergize pump 24 and pump relay coil 121 and, as described above, provide a path for the out of order relay 99. Meanwhile, the closing of contact 7T′ causes drain valve 125 (FIGURE 3A) to be energized and the filter 126 starts draining. In the case of the filter cake system illustrated in FIGURE 3, closure of 7T′ would start shaker motor 38.

The backwash phase

The period from the beginning of the 1st to the end of the 6th interval on the auxiliary timer is called the "start" period or phase and the start of the 7th interval making the beginning of the "backwash" period or phase. If unit 11 had not been started prior to the 7th interval then it would have had to wait until the end of the backwash period to receive solvent and progress into the "clean" period, since timer switch 4T′ and diverter valve switch 3T′ are opened at this point. However, unit 11 would still accept and tumble loads until solvent is again available at the end of the "backwash" period. If, as mentioned, before, cleaning unit 11 had been started prior to the 7th interval, "backwash" would have been delayed until unit 11 had completed its "clean" period. In either case it can be seen that while backwash is always preceded by a "clean" period it cannot be initiated during a "clean" period. In order to advance into backwash, diverter valve switch contacts 124 and 128 must be closed. This condition cannot exist while either or both units 10 and 11 are in a "clean" period. Auxiliary timer 114 then progresses in the "backwash" period and at the start of the 13th interval contacts 1T′ and 7T′ are opened and 1B′ and 7B′ are closed. This energizes solvent pump 24, as previously described, and two intervals later contact 7B′, having performed its pump energizing function, is opened. Also, the filter drain valve 125 (FIGURE 3A) or filter shaker motor 27 (FIGURE 3) has been deenergized by the opening of contact 7T′.

The carbon contact phase

At the start of the 16th interval contacts 3T′, 4T′, 5T′ and 6T′ are closed thereby permitting operation of timers and opening of the diverter valves to provide solvent flow to either of cleaning units 10 and 11 that may have been started during the "backwash" period. Also, at this point, the carbon "contact" period or phase begins and lasts until the end of the 28th interval. During this period there are no timer switch contact position changes, and solvent is continuously pumped through the filter for carbon contact to recondition the solvent.

Then, at the end of the 28th interval, contact 2T′ is closed and 2B′ is opened. Since at this time at least one of cleaning units 10 and 11 will be in operation, and either or both door unlock switches 127 or 131 will be open, auxiliary timer 114 will be stalled or deenergized. At the point where the last, if the two units are running, cleaning unit 10 and 11 completes its cycle, and both doors are unlocked closing switches 127 and 131, auxiliary timer 114 "sees" a circuit again and advances to its 30th interval. At the end of the 30th interval, contacts 2T', 1B', 3T', 4T', 5T' and 6T' are opened and contacts 1T', 2B', and 8B' are closed. This deenergizes the pump 24, provides the out of order relay 99 with a circuit, opens the circuits to the unit timer 107 and diverter valve 101 and places the auxiliary timer 114 back in the door lock circuit comprising switches 115 and 116. However, since both doors are unlocked, switches 115 and 116 are open and the auixlary timer 114 is deenergized.

*The standby phase*

The solvent control system is now at the point from whence it started when a cleaning cycle was initiated. The final period just described, namely, the 29th and 30th interval, which ended in a shutdown of pump 24, is referred to as the "standby" period or phase. The solvent system control will now remain in this position until another cleaning cycle is initiated.

*The further correlation of the dry cleaning system to the solvent reconditioning system*

At this point it is necessary to describe the function of the bypass relay 111 and its normally closed contacts 110 located across the auxiliary timer contacts 4T'. The relay coil energizing circuit, however, is through the diverter valve timer contact 5B. When dry cleaning unit 10 is placed in operation contact 5B of its timer is in a closed position. Therefore the bypass relay coil 111 is energized and its contacts 110 are held open. However, contact 5B is only closed at the start of and during the "clean" period. This means that auxiliary timer contact 4T' is only effective in locking out the unit timer during a clean period, and, this lockout function, which is associated with "backwash" and "start," serves only to prevent advancement into a "clean" period. Once a unit has progressed through a "clean" period (the end of the 9th interval on the cleaning unit timer 107) contact 5B is opened. This deenergizes bypass relay coil 111 causing contacts 110 to close and short contact 4T' thereby nullifying its effect. This action allows a unit operating beyond the "clean" period to progress without delay regardless of the solvent system process taking place.

Aside from the pump start switch 132, which is a momentary switch, the only solvent system control component not yet discussed is switch contact 10B known as the auxiliary control spin switch. Since the above system description involved *phasing* of cleaning units, the spin switch contact 10B played no active part in the function of the solvent system control. However, in certain cases it is possible to have periods where there is always at least one cleaning unit in operation. Under these conditions the auxiliary timer 114 never "sees" a closed circuit through the door unlock switches 127 and 131 while in the "standby" period. The solvent pump 24 would therefore run continuously and filter "backwash" and "contact" would never occur. However, the control system does not permit this to happen and the following illustration will serve as an example. Suppose that cleaning unit 10 has almost completed its cycle, which means that the filter has been backwashed and the auxiliary control is in the "standby" position. However, just before unit 10 completes its cycle, or, if it has completed its cycle, unit 11 is started before the auxiliary timer has completed the 54 seconds of its "standby" period. This means that pump 24 has not been shut down and unit 11 can progress into the clean period without delay. Then just before unit 11 completes its "clean" period unit 10 is started. Since the pump is still running unit 10 progresses into the "clean" period without delay. This means that so far two units will have completed a "clean" cycle without a backwash. Now, it would seem that as long as the cleaning units 10 and 11 are kept operating simultaneously the auxiliary timer 114 will never be driven out of the standby period (FIGURE 5). However, when unit 10 reaches the "spin" period (FIGURE 4), this means that both units 10 and 11 are beyond the "clean" period and both diverter valve switches are closed. Then, as unit 10 starts into spin, switches 8T and 10B are closed providing the auxiliary timer with a circuit to drive it out of standby into "start," through "start" and into "backwash."

The previous example illustrates only one of several possible usage patterns requiring use of the spin switch contact 10B to drive the auxiliary timer 114 into a "start" position where it can have a circuit through door lock switches 115 and 116. In any case, however, the solvent system control will never allow more than two cleaning units to operate, either singly or simultaneously, in a clean period without a "backwash."

While the above description might seem to indicate that the timing requirements of the two solvent filter systems are the same, this is actually not the case. For example, "shakedown" in the filter cake system (FIGURE 3) requires more time than "drain" in the cartridge system (FIGURE 3A). Also, where a delay is required after starting pump 24 in the filter system of FIGURE 3, to allow for powder deposit prior to admitting solvent to the cleaning units, there is no similar delay required by the cartridge system of FIGURE 3A. The effect of these differences results in the control system being designed primarily to handle the filter cake system of FIGURE 3. However, this does not prevent its use with the cartridge system of FIGURE 3A. The reason for this is that the only difference recognized by the cleaning units 10 and 11 is delay time and the additional delay introduced by a timer such as 114 designed for the filter cake system does not affect the performance of the cartridge system. Therefore, the auxiliary control system, as designed, is compatible with bolt filter systems.

It should be noted further that the auxiliary timer energizing circuit during the standby period is through the solvent high pressure switch 133 of safety circuit 95. If a high pressure failure should occur during a filter "contact" period, timer 114 will not be permitted to advance to the end of the standby period and deenergize pump 24. Therefore, by keeping the pump 24 energized, the high pressure switch 133 will stay open and future cleaning cycles would be prevented, as they should under this condition.

An important feature of the auxiliary control system worthy of mention is that the impulse time and number of impulses on the auxiliary timer 114. The same cycle used to describe the spin switch contact 10B can also be used to show the critical nature of the impulse time of the auxiliary timer. Assume that unit 10 reaches the spin period and the auxiliary timer starts to drive out of the standby period. In the meantime units 10 and 11 continue to progress in their respective operating cycles, and that unit 11 will finish its cycle first. For purposes of illustration let's assume there is no more need for unit 11. Shortly thereafter unit 10 will finish its cycle. If unit 10 finishes its cycle before the auxiliary timer 114 drives back into the standby period then both door lock switches 115 and 116 will be open when auxiliary timer 114 is running through 2B'. This will stall auxiliary timer 114 in the filter "contact" period. If there is no further need for dry cleaners 10 and 11, pump 24 will be left running thereby defeating one of the basic purposes of the auxiliary control system, namely, to have pump 24 deenergized when there are no dry cleaners in use.

Under the conditions stated above it is therefore important that the time required for the auxiliary timer 114 to drive from the beginning of the standby period all the way through its cycle and back to the next standby period be less than the time required for a cleaning unit timer 107 to drive from the beginning of the "spin" period to the end of its cycle. For each of cleaning units 10 and 11 this minimum time is 855 seconds. The time required for auxiliary timer 114 to go from standby to standby is 815 seconds. Therefore, the auxiliary timer 114, under the conditions stated above, will reach the standby period before the last unit finishes its cycle and if no more dry cleaning cycles are initiated pump 24 will be deenergized.

To prevent solvent temperatures from rising above a predetermined level, it is necessary to provide for solvent cooling. In the two-unit dry cleaner system, solvent cooling is accomplished by pumping the solvent through a coaxial heat exchanger. As solvent flows through the inner conduit 32 of the heat exchanger, water is caused to flow through the annular space between the inner conduit 32 and the outer tubular jacket 31. The water temperature is maintained lower than the temperature of the solvent, whereby heat is removed from the solvent to lower its temperature. Since the heat exchanger is located in the solvent line 32 between filter 21 and cleaning units 10 and 11, solvent flows through the heat exchanger whenever pump 24 is running. However, water is permitted to flow through the heat exchanger only when pump 24 is running and there is a demand for solvent cooling.

Referring to FIGURES 3 and 4 the operation of the solvent cooling control may be described as follows:

When the auxiliary timer is on the 1st or 30th interval, which is its normal position when both units 10 and 11 are not in use, contact 8B' will be closed. If, during this time, solvent cooling is required, the solvent cooling thermostat 34 will be closed. The pump 24 will then have an energizing circuit through 8B', the cooling stat 34, and contact 1T'. The water solenoid 33 will also have an energizing circuit through cooling stat 34 and auxiliary timer switch contact 1T'. At any other time during an auxiliary timer cycle, providing pump 24 is running, water solenoid 33 will be energized through holding relay contacts 122 when the cooling stat 34 closes. If, however, the pump 24 is deenergized or shut down for a filter backwash, the closing of cooling stat 34 will energize water solenoid 33 as usual; however, since the pump is off and 8B' is open thereby preventing pump starting, no solvent cooling will take place.

With the exception of short delays, the solvent cooling system will always provide for cooling whether or not there are any cleaning units in operation. Also, it will never interfere with normal pump shutdown during the operation of the cleaning units.

It will therefore be appreciated that the invention in providing for dropping of the filter cake after each dry-cleaning cycle, and redepositing the same upon the filter tubes, increases the effective life of the diatomaceous earth. Also, smaller filters may be used with a resultant lower capital investment. In the event a cartridge type filter is used, the pressure of the liquid solvent in the cartridge is reduced upon deenergization of the pump, thereby advantageously relaxing the filter element just prior to cleaning same.

In further accordance with the invention, the dry cleaning control system and the reconditioning control system each can be considered as separate systems which cooperate with one another to minimize interference with cleaning clothes, which is the primary function of the machine. For example, if the reconditioning system is in operation when a user desires to clean a load of clothes, the machine will accept the clothes and the coins and will start tumbling the clothes without giving the customer any indication that the machine is not ready for a cleaning operation. The cleaning circuit will "consult" with the reconditioning system to determine whether or not it is conflicting with a reconditioning operation. In the event there is a conflict with the reconditioning system, the dry cleaner control system will remain idle until receiving a clear signal from the reconditioning system, before a control circuit for injecting solvent into the cleaning drum is energized. Once solvent has been injected, the reconditioning system must await a signal from the dry cleaner control system before it may continue in its reconditioning cycle. A further example of control coordination occurs when the reconditioning system, which has completed its cycle and is ready for pump shutdown, awaits a signal from the dry cleaner system to execute the shut-down, but which signal is not provided while the solvent temperature is at an elevated value.

It will therefore be appreciated that the invention advantageously provides for a dry cleaning system having cleaning basket means, the interrelating of the controls of the basket means with the controls of the solvent reconditioning system in order to achieve operation of the basket means through a cycle and without interference from the solvent reconditioning system. As has been demonstrated hereinbefore, apparatus of this general type has a number of advantages, relating for example to reducing the capital investment (by using smaller and cheaper filters which are cleaned after every two-dry-cleaning cycles) and ensuring maximum useful time for the machine, with the least expense to the owner.

I claim:

1. In dry cleaning apparatus adapted to perform a multiphase dry cleaning cycle of operation of the type described, the combination comprising: at least a pair of rotatable baskets for material to be cleaned; individual motor means for rotating each said basket; a cleaning solvent reconditioning system; means for maintaining circulation of cleaning solvent from said reconditioning system through each said basket individually or through both baskets simultaneously as they are rotated during the clean phases of their respective dry cleaning cycles; first electrical circuit means including a first timer and first control means operable thereby to provide automatic operation of each said basket through a sequence of dry cleaning phases; and a second electrical circuit including a second timer and second control means operable thereby to provide automatic operation of said solvent reconditioning system through a cycle comprising a predetermined sequence of phases, said first and second electrical circuit means including circuit elements so interrelated as to provide for rotation of said basket means, either separately or simultaneously, in the event that reconditioned solvent has not yet been made available by said second control circuit means, said last recited circuit means thereafter being operable upon completion of a solvent reconditioning cycle to provide for initiation of a dry cleaning cycle as said baskets continue to rotate.

2. Apparatus according to claim 1 and characterized in that said first control means provides a cleaning cycle of a predetermined fixed duration, and said second control means provides a solvent reconditioning cycle of a predetermined fixed duration which is less than the duration of said cleaning cycle, said first and second control means including switch means operable during a selected phase of the dry cleaning cycle to condition interrelated elements of the first and second circuit means to provide for completion of a solvent reconditioning cycle prior to completion of a cleaning cycle.

3. Apparatus according to claim 2 and further characterized in that said first and second electrical circuits are so interrelated as to provide, during a dry cleaning cycle, a clean phase and a dry phase, each of predetermined fixed duration irrespective of the solvent reconditioning phases taking place.

4. Apparatus according to claim 1, and characterized in that said solvent reconditioning system includes a solvent filter, a pump for circulating solvent to be reconditioned through said filter, and a tank for storing solvent, said first and second circuit means being cooperable, when said first circuit means is conditioned to provide the recited clean phase, to ensure operation of said pump for the duration of said last mentioned phase.

5. In dry cleaning apparatus including a plurality of individual dry cleaning units serviced by a common solvent storage, circulating, and filtering system, the combination comprising: a rotatable basket associated with each of said units for the receipt of material to be cleaned;

motor means for rotating each said basket; an air drying system operably associated with each of said dry cleaning units and comprising air circulating, heating, and filtering means; means for maintaining circulation of cleaning solvents through said filtering system and through one or more of said baskets during the cleaning phase of the dry cleaning cycle; a first electrical circuit including a first timer and first control means operable thereby to provide automatic operation of individual ones of said units through a sequence of dry cleaning phases; a second electrical circuit including a second timer and second control means operable thereby to provide automatic operation of said solvent storage circulating and filtering system either simultaneously with or independently of said sequence of dry cleaning phases; and means operable by said first and second control means for automatically modifying the circuit connections of said electrical circuits in accordance with the phases of operation being carried out, and on the occurrence of a solvent conditioning phase during which solvent is unavailable for any of said baskets, to provide for rotation of any one of said selected baskets prior to initiating the dry cleaning cycle thereof, until such time as solvent is made available for the dry cleaning operation.

6. Apparatus according to claim 5 and characterized in that said first control means provides a cleaning cycle of a predetermined fixed duration, and said second control means provides a solvent conditioning cycle of a predetermined fixed duration which is less than the duration of said cleaning cycle, said first and second control means including switch means operable during a selected phase of the dry cleaning cycle to condition interrelated elements of the first and second circuit means to provide for completion of the solvent reconditioning cycle prior to completion of the cleaning cycle.

7. Apparatus according to claim 6 and further characterized in that said first and second electrical circuits are so interrelated as to provide, during the dry cleaning cycle, a clean phase and a dry phase, each of predetermined fixed duration irrespective of the solvent reconditioning phases taking place.

8. Apparatus according to claim 5 and characterized in that said first and second circuit means are cooperable, when said first circuit means is conditioned to provide the recited cleaning phase, to provide operation of said means for maintaining circulation of cleaning solvent for the duration of said last mentioned phase.

9. In dry cleaning apparatus adapted to perform a multiphase dry cleaning cycle of operation of the type described, the combination comprising: at least a pair of rotatable baskets for material to be cleaned; individual motor means for rotating each said basket; a cleaning solvent reconditioning system; means for maintaining circulation of cleaning solvent through each said basket individually or through both baskets simultaneously during the clean phases of the respective dry cleaning cycles of said baskets; first electrical circuit means including a first timer and first control means operable thereby to provide automatic operation of each said basket through a sequence of dry cleaning phases; and a second electrical circuit including a second timer and second control means operable thereby to provide automatic operation of said solvent reconditioning system through a cycle comprising a predetermined sequence of phases, said first and second electrical circuit means including circuit elements so interrelated as to provide for completion of a solvent reconditioning cycle prior to completion of a dry cleaning cycle of operation.

10. Apparatus according to claim 9 and further characterized in that said first and second electrical circuits are so interrelated as to provide, during a dry cleaning cycle, a clean phase and a dry phase, each of predetermined fixed duration irrespective of the phases of solvent reconditioning cycle taking place.

11. In dry cleaning apparatus including a plurality of individual dry cleaning units serviced by a common solvent storage, circulating, and filtering system, the combination comprising: a rotatable basket associated with each of said units for the receipt of material to be cleaned; motor means for rotating each said basket; an air drying system operably associated with each of said dry cleaning units comprising air circulating, heating, and filtering means; means for maintaining circulation of cleaning solvents through said solvent filtering system and through one or more of said baskets during the clean phase of the dry cleaning cycle; a filter media in said filtering system; means operable to recondition said filter media in said filtering system; a first electrical circuit including a first timer and first control means operable thereby to provide automatic operation of individual ones of said units through a sequence of dry cleaning phases; a second electrical circuit including a second timer and second control means operable thereby to provide automatic operation of said solvent storage circulating and filtering system either simultaneously with or independently of said sequence of dry cleaning phases; and means operable by said first and second control means for automatically modifying the circuit connections of said electrical circuits in accordance with the phases of operation being carried out, to effect operation of said filter reconditioning means prior to completion of a cleaning cycle.

12. Apparatus according to claim 11 and characterized in that said filter media comprises a removable filter cartridge, and said means operable to recondition said filter media comprises a drain conduit means operable to provide reverse flow of liquid solvent through said filter.

13. Apparatus according to claim 11 and characterized in that said filter media comprises an expansible porous member upon which a filter cake is maintained, and said means for reconditioning said filter media comprises a device for moving said porous member to remove said filter cake.

References Cited by the Examiner

UNITED STATES PATENTS

| 3,085,415 | 4/1963 | Gosnell | 68—12 |
| 3,089,325 | 5/1963 | Robbins et al. | 68—18.1 |
| 3,122,908 | 3/1964 | Stanulis et al. | 68—12 |
| 3,132,501 | 5/1964 | Jacobs et al. | 68—18.1 |
| 3,162,032 | 12/1964 | Behrens | 68—18 |

WALTER A. SCHEEL, *Primary Examiner.*

WILLIAM I. PRICE, *Examiner.*